US010450452B2

(12) United States Patent
Lummerstorfer et al.

(10) Patent No.: US 10,450,452 B2
(45) Date of Patent: Oct. 22, 2019

(54) FIBER REINFORCED POLYPROPYLENE COMPOSITE

(71) Applicant: BOREALIS AG, Vienna (AT)

(72) Inventors: Thomas Lummerstorfer, Gramastetten (AT); Michael Jerabek, Leonding (AT); Lukas Sobczak, Linz (AT); Claudia Pretschuh, Leonding (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/318,682

(22) PCT Filed: Jul. 18, 2017

(86) PCT No.: PCT/EP2017/068118
§ 371 (c)(1),
(2) Date: Jan. 17, 2019

(87) PCT Pub. No.: WO2018/024480
PCT Pub. Date: Feb. 8, 2018

(65) Prior Publication Data
US 2019/0241725 A1    Aug. 8, 2019

(30) Foreign Application Priority Data

Aug. 3, 2016 (EP) .................................... 16182580

(51) Int. Cl.
| | |
|---|---|
| *C08L 23/12* | (2006.01) |
| *C08L 23/14* | (2006.01) |
| *B29C 70/52* | (2006.01) |
| *B29C 70/16* | (2006.01) |
| *C08K 7/02* | (2006.01) |
| *B29C 70/08* | (2006.01) |
| *B29K 23/00* | (2006.01) |
| *B29K 229/00* | (2006.01) |
| *B29K 267/00* | (2006.01) |
| *B29K 277/00* | (2006.01) |
| *B29K 201/00* | (2006.01) |
| *C08J 5/04* | (2006.01) |

(52) U.S. Cl.
CPC ............ *C08L 23/142* (2013.01); *B29C 70/08* (2013.01); *B29C 70/16* (2013.01); *B29C 70/52* (2013.01); *C08K 7/02* (2013.01); *C08L 23/12* (2013.01); *B29K 2023/12* (2013.01); *B29K 2023/14* (2013.01); *B29K 2201/12* (2013.01); *B29K 2229/04* (2013.01); *B29K 2267/003* (2013.01); *B29K 2277/00* (2013.01); *C08J 5/047* (2013.01); *C08L 2205/03* (2013.01); *C08L 2205/16* (2013.01); *C08L 2207/02* (2013.01)

(58) Field of Classification Search
CPC .......... C08L 23/12; C08L 23/142; C08K 7/02
See application file for complete search history.

(56) References Cited

U.S. PATENT DOCUMENTS

| | | | |
|---|---|---|---|
| 5,234,879 A | 8/1993 | Garoff et al. | |
| 2008/0045638 A1* | 2/2008 | Chapman | C08L 23/10 524/425 |
| 2015/0252179 A1* | 9/2015 | Kwon | C08K 7/02 524/13 |
| 2016/0040001 A1* | 2/2016 | Desille | C08L 23/10 524/13 |
| 2016/0229997 A1* | 8/2016 | Mohanty | C08L 23/12 |
| 2019/0127562 A1* | 5/2019 | Lee | C08L 23/12 |

FOREIGN PATENT DOCUMENTS

| | | |
|---|---|---|
| CA | 3026017 A1 | 1/2018 |
| CN | 101519929 A | 9/2009 |
| CN | 104204070 A | 12/2014 |
| CN | 104736631 A | 6/2015 |
| CN | 104884524 A | 9/2015 |
| EP | 0491566 B1 | 9/1992 |
| EP | 0887379 A1 | 12/1998 |
| EP | 2610271 A1 | 7/2013 |
| EP | 2610272 A1 | 7/2013 |
| EP | 2610273 A1 | 7/2013 |
| JP | 2007-91792 A | 4/2007 |
| JP | 2010-215887 A | 9/2010 |
| JP | 2013-067789 A | 4/2013 |
| JP | 2015-71674 A | 4/2015 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 99/33843 A1 | 7/1999 |
| WO | 00/68315 A1 | 11/2000 |

(Continued)

OTHER PUBLICATIONS

Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.

H.N.Cheng, "13C NMR Analysis of Ethylene-Propylene Rubbers", Macromolecules 1984, 17, 1950-1955.

Kakugo et al., "13C NMR Determination of Monomer Sequence Distribution in Ethylene-Propylene Copolymers Prepared with d-TiCl3-Al(C2H5)2Cl" Macromolecules 1982, 15, pp. 1150-1152.

Resconi et al., "Selectivity in Propene Polymerization with Metallocene Catalysts", Chem. Rev. 2000, 100, pp. 1253-1345.

Singh et al., "Triad sequence determination of ethylene-propylene copolymers-application of quantitative 13C NMR", Polymer Testing 28 (2009) pp. 475-479.

(Continued)

*Primary Examiner* — Peter D. Mulcahy
(74) *Attorney, Agent, or Firm* — Tarolli, Sundheim, Covell & Tummino LLP

(57) ABSTRACT

The present invention relates to a new composite comprising cellulose-based fiber and polymer-based fiber as well as to a process for the preparation of the composite and molded articles made from said composite.

15 Claims, No Drawings

(56) References Cited

FOREIGN PATENT DOCUMENTS

| WO | 2004/000899 A1 | 12/2003 |
|---|---|---|
| WO | 2004/111095 A1 | 12/2004 |
| WO | 2008/020925 A1 | 2/2008 |
| WO | 2012/007430 A1 | 1/2012 |
| WO | 2014/147103 A1 | 9/2014 |

OTHER PUBLICATIONS

Wang et al., "Structural Analysis of Ethylene/Propylene Copolymers Synthesized with a Constrained Geometry Catalyst", Macromolecules 2000, 33, pp. 1157-1162.

Zhou et al., "A new decoupling method for accurate quantification of polyethylene copolymer composition and triad sequence distribution with 13C NMR", Journal of Magnetic Resonance 187 (2007) pp. 225-233.

Zweifel, et al., "Plastics Additives Handbook", 5th Edition, Department of Materials, Institute of Polymers, 2001.

Zweifel, et al., "Plastics Additives Handbook", 6th Edition, Department of Materials, Institute of Polymers, 2008.

Office action for Canadian Patent Application No. 3027864, dated Feb. 6, 2019.

Chinese Office action for Patent application No: 201780042029.8, dated Jun. 10, 2019.

Japanese Office action for Patent Application No: 2018-565283, dated Jul. 16, 2019.

* cited by examiner

FIBER REINFORCED POLYPROPYLENE COMPOSITE

The present invention relates to a new composite comprising cellulose-based fiber and polymer-based fiber as well as to a process for the preparation of the composite and molded articles made from said composite.

Reinforced composites are well known and quite often applied in the automobile industry. In the automotive industry, there is a trend towards the reduction of the carbon footprint of materials. This leads to the combination of traditional, fossil-based thermoplastics such as polypropylene with renewable reinforcements obtained from natural fibers or wood. This approach sounds tempting for injection-moulded automotive interior parts for visible and non-visible applications but several hurdles are potentially hindering their successful use. One major drawback is the poor impact strength of such composite materials which is even more pronounced for wood fibers than for other natural fibers such as hemp or flax or man-made cellulose fibers such as Tencel®. The disadvantageous combination of rather high average particle size (large particles act as defects facilitating crack initiation) and low aspect ratio brings along a moderate to poor mechanical property profile, especially when it comes to impact strength. Even if heterophasic polypropylene copolymers with high rubber contents are used as matrices in such a composite, the excellent impact strength of the base material deteriorates upon addition of wood fibers already at low filler level. Efforts to improve impact strength by suppressing cavitation of the elastomer phase of PP/Wood Fiber composites by adding a specific polyethylene to such composites results in improved impact strength (see e.g. unpublished European patent application 15 181 060.3 of the applicant) but the amount of polyethylene required to get a significant effect is rather high.

Thus, there is still a need in the art for composites being lightweight, easy to process and having improved balance between toughness and stiffness, especially compared to composites comprising a cellulose-based fiber (CF) as reinforcing fiber material only.

The finding of the present invention is to provide a composite comprising 25 to 92.5 wt.-%, based on the total weight of the composite, of a polypropylene base material having a melt flow rate $MFR_2$ (230° C., 2.16 kg) measured according to ISO 1133 in the range of from 3.0 to 140.0 g/10 min, wherein the polypropylene base material is i) a heterophasic propylene copolymer (HECO) comprising a (semicrystalline) polypropylene (PP) as a matrix in which an elastomeric propylene copolymer (EC) is dispersed; or ii) a propylene homopolymer (hPP); and 5 to 50 wt.-%, based on the total weight of the composite, of a cellulose-based fiber (CF); and 2.5 to 25 wt.-%, based on the total weight of the composite, of a polymer-based fiber (PF).

Accordingly, the present invention is especially directed to a composite having an elongation at break in the range from 2.5 to 7.5%, comprising
a) 25 to 92.5 wt.-%, based on the total weight of the composite, of a polypropylene base material (PBM) having a melt flow rate $MFR_2$ (230° C., 2.16 kg) measured according to ISO 1133 in the range of from 3.0 to 140.0 g/10 min, wherein the polypropylene base material (PBM) is i) a heterophasic propylene copolymer (HECO) comprising a (semicrystalline) polypropylene (PP) as a matrix in which an elastomeric propylene copolymer (EC) is dispersed; or
ii) a propylene homopolymer (hPP); and
b) 5 to 50 wt.-%, based on the total weight of the composite, of a cellulose-based fiber (CF); and
c) 2.5 to 25 wt.-%, based on the total weight of the composite, of a polymer-based fiber (PF) having a melting temperature of ≥210° C.,
wherein the weight ratio of the cellulose-based fiber (CF) and the polymer-based fiber (PF) [(CF)/(PF)] is at least 2:1.

In one embodiment the heterophasic propylene copolymer (HECO) has a) a melt flow rate $MFR_2$ (230° C., 2.16 kg) in the range of from 5.0 to 120.0 g/10 min, and/or b) a xylene cold soluble (XCS) fraction (25° C.) of from 15.0 to 50.0 wt.-%, based on the total weight of the heterophasic propylene copolymer (HECO), and/or c) a comonomer content of ≤30.0 mol.-%, based on the heterophasic propylene copolymer (HECO).

In another embodiment the amorphous fraction (AM) of the heterophasic propylene copolymer (HECO) has a) a comonomer content in the range of 30.0 to 60.0 mol.-%, based on the amorphous fraction (AM) of the heterophasic propylene copolymer (HECO), and/or b) an intrinsic viscosity (IV) in the range of 1.8 to 4.0 dl/g.

In yet another embodiment the propylene homopolymer (hPP) has a) a melt flow rate $MFR_2$ (230° C., 2.16 kg) in the range of from 5.0 to 120.0 g/10 min, and/or b) a melting temperature measured according to ISO 11357-3 of at least 150° C., and/or c) a xylene cold soluble (XCS) content, i.e. below 4.5 wt.-%, based on the total weight of the propylene homopolymer (hPP).

In one embodiment the cellulose-based fiber (CF) is selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydoxyethyl cellulose, carboxymethyl cellulose (CMC), and any mixtures thereof, and or has a volume moment mean (D[4.3]) diameter between 1 and 1 200 μm.

In another embodiment the polymer-based fiber (PF) is selected from a poly vinyl alcohol (PVA) fiber, a polyethylene terephthalate (PET) fiber, a polyamide (PA) fiber and mixtures thereof, preferably a polyethylene terephthalate (PET) fiber or a poly vinyl alcohol (PVA) fiber.

In yet another embodiment the polymer-based fiber (PF) has i) a fiber average diameter in the range of 10 to 30 μm, and/or ii) a tenacity of from 3.0 cN/dtex to 17 cN/dtex.

In one embodiment the melting temperature Tm according to ISO 11357-3 of the polymer-based fiber (PF) is ≥42° C., preferably from 42 to 200° C., above the melting temperature Tm according to ISO 11357-3 of the polypropylene base material.

In another embodiment the weight ratio of the cellulose-based fiber (CF) and the polymer-based fiber (PF) [(CF)/(PF)] is in the range of 2.0 to 30.0, more preferably in the range of 2.0 to 20.0, and most preferably in the range of 2.0 to 10.0.

In yet another embodiment the composite comprises an adhesion promoter (AP), preferably in an amount from 0.1 to 6.0 wt.-%, based on the total weight of the composite.

In one embodiment the composite is obtainable by a process as defined herein.

The present invention is further directed to a process for the preparation of a composite as defined herein, comprising the steps of:
a) providing a polypropylene base material (PBM) as defined herein,
b) providing a cellulose-based fiber (CF) as defined herein,
c) providing a polymer-based fiber (PF) as defined herein,
d) melt-blending the cellulose-based fiber (CF) of step b) with the polypropylene base material (PBM) of step a) such as to obtain a cellulose-based fiber reinforced polypropylene base material,
e) impregnating the polymer-based fiber (PF) of step c) with the polypropylene base material (PBM) of step a) such as to obtain a polymer-based fiber reinforced polypropylene base material,
f) blending the cellulose-based fiber reinforced polypropylene base material obtained in step d) and the polymer-based fiber reinforced polypropylene base material obtained in step e), and
g) injection molding the blend obtained in step f), wherein step e) is carried out by pultrusion.

According to one embodiment of the present process, process step d) is carried out by extrusion, preferably in a twin screw extruder, and/or the polymer-based fiber (PF) of step c) is a continuous fiber.

According to another embodiment of the present process, the process step e) comprises impregnating and coating the polymer-based fiber (PF) of step c) with the polypropylene base material (PBM) of step a), wherein impregnating and coating is carried with the same or different polypropylene base material (PBM).

The present invention is also directed to a molded article comprising a composite as defined in the present invention. The molded article is preferably an automotive article.

The invention is now defined in more detail.

The Composite

As mentioned above the composite must comprise a polypropylene base material (PBM), a cellulose-based fiber (CF), and a polymer-based fiber (PF).

In addition, the composite may comprise an adhesion promoter (AP), alpha nucleating agents (NU) and/or additives (A). In one embodiment, the composite comprises an adhesion promoter (AP). In this embodiment, it is preferred that the polypropylene base material, the cellulose-based fiber (CF), the polymer-based fiber (PF) and the adhesion promoter (AP) make up together at least 80 wt.-%, more preferably at least 85 wt.-%, yet more preferably at least 90 wt.-%, like at least 95 wt.-%, based on the total weight of the composite, of the composite.

Accordingly, in one specific embodiment the composite consists of the polypropylene base material (PBM), the cellulose-based fiber (CF), and the polymer-based fiber (PF), the adhesion promoter (AP) and the optional alpha nucleating agents (NU) and/or additives (A).

In one preferred embodiment the weight ratio of the cellulose-based fiber (CF) and the polymer-based fiber (PF) [(CF)/(PF)] is in the range of 2.0 to 30.0, more preferably in the range of 2.0 to 20.0, and most preferably in the range of 2.0 to 10.0.

Alternatively or additionally to the previous paragraph it is preferred that the weight ratio of the polypropylene base material (PBM) and the cellulose-based fiber (CF) [(PBM)/(CF)] is in the range of 0.25 to 30.0, more preferably in the range of 0.5 to 20.0, yet more preferably in the range of 1.25 to 10.0, like in the range of 2.0 to 6.0.

Alternatively or additionally to the previous paragraphs it is preferred that the weight ratio of the polypropylene base material (PBM) and the polymer-based fiber (PF) [(PBM)/(PF)] is in the range of 1.0 to 75.0, more preferably in the range of 2.0 to 50.0, yet more preferably in the range of 3.0 to 30.0, like in the range of 4.0 to 25.0.

In one preferred embodiment, the total weight of the cellulose-based fiber (CF) and the polymer-based fiber (PF) is in the range of 6.0 to 50.0 wt.-%, based on the total weight of the composite, preferably in the range of 10.0 to 40.0 wt.-%, more preferable in the range of 15.0 to 37.5 wt.-% and most preferably in the range of 17.5 to 35.0 wt.-%.

Thus, the weight ratio of the polypropylene base material (PBM) to the sum of the cellulose-based fiber (CF) and the polymer-based fiber (PF) [(PBM)/(CF+PF)] is preferably in the range of 1.0 to 15.7, more preferably in the range of 1.0 to 10.0, yet more preferably in the range of 1.5 to 5.0.

If present, the weight ratio of the cellulose-based fiber (CF) and the adhesion promoter (AP) [(CF)/(AP)] is in the range of 0.8 to 300.0, more preferably in the range 4.0 to 15.0, yet more preferably in the range of 5.0 to 12.0.

Alternatively or additionally to the previous paragraph it is preferred that the weight ratio of the polymer-based fiber (PF) and the adhesion promoter (AP) [(PF)/(AP)] is in the range of 0.1 to 250.0, more preferably in the range 0.8 to 10.0, yet more preferably in the range of 1.5 to 6.0.

It is especially preferred that the composite comprises
a) 25.0 to 92.5 wt.-%, more preferably 50.0 to 91.0 wt.-%, still more preferably 55.0 to 90.0 wt.-%, yet more preferably 58.0 to 89.0 wt.-% and most preferably 60.0 to 88.0 wt.-%, based on the total weight of the composite, of a polypropylene base material (PBM) having a melt flow rate $MFR_2$ (230° C., 2.16 kg) measured according to ISO 1133 in the range of from 3.0 to 140.0 g/10 min, wherein the polypropylene base material (PBM) is
  i) a heterophasic propylene copolymer (HECO) comprising a (semicrystalline) polypropylene (PP) as a matrix in which an elastomeric propylene copolymer (EC) is dispersed; or
  ii) a propylene homopolymer (hPP); and
b) 5.0 to 50.0 wt.-%, more preferably 8.6 to 45.0 wt.-%, still more preferably 10.0 to 40.0 wt.-%, yet more preferably 12.5 to 35.0 wt.-% and most preferably 15.0 to 30.0 wt.-%, based on the total weight of the composite, of a cellulose-based fiber (CF); and
c) 2.5 to 25.0 wt.-%, more preferably 1.4 to 22.0 wt.-%, still more preferably 2.0 to 19.0 wt.-%, yet more preferably 2.5 to 18.0 wt.-% and most preferably 3.0 to 15.0 wt.-%, based on the total weight of the composite, of a polymer-based fiber (PF) having a melting temperature of ≥210° C.

In one embodiment, the composite comprises an adhesion promoter (AP).

Therefore, it is especially preferred that the composite comprises, preferably consists of,
a) 25.0 to 92.5 wt.-%, more preferably 50.0 to 91.0 wt.-%, still more preferably 55.0 to 90.0 wt.-%, yet more preferably 58.0 to 89.0 wt.-% and most preferably 60.0 to 88.0. wt.-%, based on the total weight of the composite, of a polypropylene base material (PBM) having a melt flow rate $MFR_2$ (230° C., 2.16 kg) measured according to ISO 1133 in the range of from 3.0 to 140.0 g/10 min, wherein the polypropylene base (PBM) material is i) a heterophasic propylene copolymer (HECO) comprising a (semicrystalline) polypropylene (PP) as a matrix in which an elastomeric propylene copolymer (EC) is dispersed; or ii) a propylene homopolymer (hPP); and b) 5.0 to 50.0 wt.-%, more preferably 8.6 to 45.0 wt.-%, still more preferably 10.0 to 40.0 wt.-%, yet more preferably 12.5 to 35.0 wt.-% and most preferably 15.0 to 30.0 wt.-%, based on the total weight of the composite, of a cellulose-based fiber (CF); and c) 2.5 to 25.0 wt.-%, more preferably 1.4 to 20.0 wt.-%, still more preferably 2.0 to 16.0 wt.-%, yet more preferably 2.5 to 16.0 wt.-% and most preferably 3.0 to 15.0 wt.-%, based on the total weight of the composite, of a polymer-based fiber (PF) having a melting temperature of ≥210° C.

a) optionally up to 6.0 wt.-%, more preferably 0.1 to 6.0 wt.-%, still more preferably 0.1 to 5.0 wt.-%, yet more preferably 0.2 to 4.0 wt.-% and most preferably 0.2 to 3.0 wt.-%, based on the total weight of the composite, of an adhesion promoter (AP).

The composite may comprise in addition alpha-nucleating agents (NU) and/or additives (A). According to this invention the alpha nucleating agent (NU) is not an additive (A). Accordingly, it is preferred that the composite contains up to 5.0 wt.-%, preferably $1.0 \times 10^{-5}$ to 4.0 wt.-%, more preferably $2.0 \times 10^{-5}$ to 2.0 wt.-%, based on the total weight of the composite, of alpha nucleating agents (NU) and/or up to 8.0 wt.-%, preferably 0.1 to 6.0 wt.-%, more preferably 0.5 to 4.0 wt.-%, based on the total weight of the composite, of additives (A).

It is appreciated that the sum of the polypropylene base material (PBM), the cellulose-based fiber (CF), polymer-based fiber (PF) and the optional adhesion promoter (AP), alpha-nucleating agents (NU) and additives (A) is 100.0 wt.-%, based on the total weight of the composite.

In one embodiment, the composite is free of a polyethylene (PE). Particularly, it is preferred that the composite is free of a polyethylene (PE) having a density in the range of 935 to 970 kg/m$^3$. Accordingly, it is preferred that the composite is free of a high density polyethylene (HDPE).

Preferably the composite has a density in the range of 900 to 1100 kg/cm$^3$, more preferably in the range of 925 to 1080 kg/m$^3$, yet more preferably in the range of 930 to 1070 kg/cm$^3$.

It is especially preferred that the composite has a melt flow rate MFR$_2$ (190° C., 5 kg) in the range of 0.5 to 45.0 g/10 min, more preferably in the range of 0.8 to 42.0 g/10 min, still more preferably in the range of 1.0 to 41.0 g/10 min, like in the range of 1.2 to 40.0 g/10 min.

It is appreciated that the composite has an elongation at break measured according to ISO 527-4 in the range from 2.5 to 7.5%, preferably in the range from 2.5 to 7.0%, more preferably in the range from 2.5 to 6.5% and most preferably in the range from 3 to 6%.

The finding of the present invention is that the composite has specifically high toughness. The composite preferably has a tensile modulus of at least 1 000 MPa, preferably in the range of 1 000 to 6 000 MPa, more preferably in the range of 1 500 to 5 000 MPa, yet more preferably in the range of 2 000 to 4 500 MPa, e.g. from 2 000 to 4 000 MPa.

The finding of the present invention is that the composite has specifically high impact strength. Preferably, the composite has a Charpy notched impact strength (23° C.) of at least 3 kJ/m$^2$, more preferably in the range of 3 to 160.0 kJ/m$^2$, even more preferably in the range of 4 to 120.0 kJ/m$^2$ and most preferably in the range of 5 to 100.0 kJ/m$^2$. It is preferred that the Charpy notched impact strength (23° C.) of the composite of the present invention is higher compared to the same composite comprising cellulose-based fiber (CF) as reinforcing fiber material only, i.e. being free of the polymer-based fiber (PF), e.g. by at least 50% higher, preferably in the range of 50 to 20 000% higher, more preferably in the range of 100 to 10 000% higher, like in the range of 120 to 8 000% higher.

For example, if the polypropylene base material of the composite is a propylene homopolymer (hPP), the composite preferably has a Charpy notched impact strength (23° C.) of at least 3 kJ/m$^2$, more preferably in the range of 3 to 140 kJ/m$^2$, even more preferably in the range of 4 to 100 kJ/m$^2$ and most preferably in the range of 5 to 80 kJ/m$^2$. In this embodiment, the Charpy notched impact strength (23° C.) of the composite of the present invention is higher compared to the same composite comprising cellulose-based fiber (CF) as reinforcing fiber material only, i.e. being free of the polymer-based fiber (PF), e.g. by at least 50% higher, such as at least 200% higher, preferably in the range of 200 to 20 000% higher, more preferably in the range of 300 to 10 000% higher, like in the range of 300 to 8 000% higher.

If the polypropylene base material of the composite is a heterophasic propylene copolymer (HECO), the composite preferably has a Charpy notched impact strength (23° C.) of at least 3 kJ/m$^2$, preferably at least 5 kJ/m$^2$, more preferably in the range of 5 to 160 kJ/m$^2$, even more preferably in the range of 7 to 120 kJ/m$^2$ and most preferably in the range of 7 to 100 kJ/m$^2$. In this embodiment, the Charpy notched impact strength (23° C.) of the composite of the present invention is higher compared to the same composite comprising cellulose-based fiber (CF) as reinforcing fiber material only, i.e. being free of the polymer-based fiber (PF), e.g. by at least 50% higher, preferably in the range of 50 to 1500% higher, more preferably in the range of 100 to 1 000% higher, like in the range of 120 to 700% higher.

Additionally or alternatively the composite has a Charpy notched impact strength (−20° C.) of at least 3 kJ/m$^2$, more preferably in the range of 3 to 160.0 kJ/m$^2$, like in the range of 4 to 120.0 kJ/m$^2$. It is preferred that the Charpy notched impact strength (−20° C.) of the composite of the present invention is higher compared to the same composite comprising cellulose-based fiber (CF) as reinforcing fiber material only, i.e. being free of the polymer-based fiber (PF), e.g. by at least 50% higher, preferably in the range of 50 to 20 000% higher, more preferably in the range of 100 to 10 000% higher, like in the range of 120 to 8 000% higher.

For example, if the polypropylene base material of the composite is a propylene homopolymer (hPP), the composite preferably has a Charpy notched impact strength (−20° C.) of at least 3 kJ/m$^2$, more preferably in the range of 3 to 140.0 kJ/m$^2$, and most preferably in the range of 3 to 100.0 kJ/m$^2$. In this embodiment, the Charpy notched impact strength (−20° C.) of the composite of the present invention is higher compared to the same composite comprising cellulose-based fiber (CF) as reinforcing fiber material only, i.e. being free of the polymer-based fiber (PF), e.g. by at least 50% higher, such as at least 100% higher, preferably in the range of 100 to 20 000% higher, more preferably in the range of 110 to 10 000% higher, like in the range of 130 to 8 000% higher.

If the polypropylene base material of the composite is a heterophasic propylene copolymer (HECO), the composite preferably has a Charpy notched impact strength (−20° C.) of at least 3 kJ/m$^2$, preferably at least 5 kJ/m$^2$, more preferably in the range of 5 to 160 kJ/m$^2$, even more preferably in the range of 7 to 120 kJ/m$^2$ and most preferably in the range of 7 to 100 kJ/m². In this embodiment, the Charpy notched impact strength (−20° C.) of the composite of the present invention is higher compared to the same composite comprising cellulose-based fiber (CF) as reinforcing fiber material only, i.e. being free of the polymer-based fiber (PF), e.g. by at least 50% higher, preferably in the range of 50 to 1 500% higher, more preferably in the range of 100 to 1 000% higher, like in the range of 120 to 700% higher.

It is appreciated that the composite has a specifically favourable toughness/stiffness correlation.

Preferably, the composite has a correlation of tensile modulus to Charpy notched impact strength (23° C.) [TM/NIS] of below 840, more preferably in the range of 20 to 840, even more preferably in the range of 30 to 838 and most preferably in the range of 50 to 838. For example, the composite has a correlation of tensile modulus to Charpy notched impact strength (23° C.) [TM/NIS] in the range of 120 to 500.

For example, if the polypropylene base material of the composite is a propylene homopolymer (hPP), the composite preferably has a correlation of tensile modulus to Charpy notched impact strength (23° C.) [TM/NIS] of below 840, more preferably in the range of 20 to 840, even more preferably in the range of 30 to 838 and most preferably in the range of 50 to 838, such as in the range of 120 to 500.

If the polypropylene base material of the composite is a heterophasic propylene copolymer (HECO), the composite preferably has a correlation of tensile modulus to Charpy notched impact strength (23° C.) [TM/NIS] of below 840, more preferably in the range of 20 to 840, even more preferably in the range of 30 to 500 and most preferably in the range of 50 to 300, such as in the range of 120 to 250.

In the following the individual components of the composite are defined in more detail.

The Polypropylene Base Material

The composite according to this invention must contain a polypropylene base material (PBM) having a melt flow rate $MFR_2$ (230° C., 2.16 kg) measured according to ISO 1133 in the range of from 3.0 to 140.0 g/10 min. Preferably, the polypropylene base material (PBM) has a melt flow rate $MFR_2$ (230° C., 2.16 kg) in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min.

It is appreciated that the polypropylene base material (PBM) is either a heterophasic propylene copolymer (HECO) comprising a (semicrystalline) polypropylene (PP) as a matrix in which an elastomeric propylene copolymer (EC) is dispersed; or a propylene homopolymer (hPP).

If the polypropylene base material (PBM) is either a heterophasic propylene copolymer (HECO), the heterophasic propylene copolymer (HECO) comprises a polypropylene (PP) as a matrix in which an elastomeric propylene copolymer (EC) is dispersed. The expression "heterophasic propylene copolymer" or "heterophasic" as used in the instant invention indicates that the elastomeric propylene copolymer (EC) is (finely) dispersed in the (semicrystalline) polypropylene (PP). In other words, the (semicrystalline) polypropylene (PP) constitutes a matrix in which the elastomeric propylene copolymer (EC) forms inclusions in the matrix, i.e. in the (semicrystalline) polypropylene (PP). Thus the matrix contains (finely) dispersed inclusions being not part of the matrix and said inclusions contain the elastomeric propylene copolymer (EC). The term "inclusion" according to this invention shall preferably indicate that the matrix and the inclusion form different phases within the heterophasic propylene copolymer (HECO), said inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Preferably, the heterophasic propylene copolymer (HECO) has a melt flow rate $MFR_2$ (230° C., 2.16 kg) in the range of 3.0 to 140.0 g/10 min, more preferably in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min. In one embodiment, the heterophasic propylene copolymer (HECO) has a melt flow rate $MFR_2$ (230° C., 2.16 kg) in the range of 5.0 to 75.0 g/10 min, even more preferably in the range of 5.0 to 50.0 g/10 min, still more preferably in the range of 5.0 to 30.0 g/10 min, and most preferably in the range of 6.0 to 25.0 g/10 min, like in the range of 7.0 to 20.0 g/10 min.

As mentioned above, the heterophasic propylene copolymer (HECO) according to this invention preferably comprises (a) a (semicrystalline) polypropylene (PP) as the matrix (M) and (b) an elastomeric propylene copolymer (EC).

Preferably the heterophasic propylene copolymer (HECO) has a comonomer content, preferably a content of ethylene and/or $C_4$ to $C_{12}$ α-olefin, more preferably an ethylene content, of equal or below 30.0 mol.-%, more preferably in the range of 10.0 to 30.0 mol.-%, still more preferably in the range of 12.0 to 25.0 mol.-%, yet more preferably in the range of 14.0 to 22.0 mol.-%, based on the heterophasic propylene copolymer (HECO).

Preferably the heterophasic propylene copolymer (HECO) has a xylene cold soluble (XCS) fraction (25° C.) in the range of 15.0 to 50.0 wt.-%, more preferably in the range of 22.0 to 50.0 wt.-%, still more preferably in the range of 25.0 to 45.0 wt.-% and most preferably in the range of 26.0 to 38.0 wt. %.

Preferably the comonomer content, preferably the content of ethylene and/or $C_4$ to $C_{12}$ α-olefin, more preferably the content of ethylene, of the amorphous fraction (AM) of the heterophasic propylene copolymer (HECO) is in the range of 30.0 to 60 mol.-%, more preferably in the range of 35.0 to 55.0 mol.-%, still more preferably in the range of 38.0 to 54.0 mol.-%, yet more preferably in the range of 40.0 to 52.0 mol.-%, based on the amorphous fraction (AM) of the heterophasic propylene copolymer (HECO).

In a preferred embodiment the intrinsic viscosity (IV) of the amorphous fraction (AM) of the heterophasic propylene copolymer (HECO) is rather high. Rather high values of intrinsic viscosity (IV) improve the impact strength. Accordingly, it is especially preferred that the intrinsic viscosity of the amorphous fraction (AM) of the heterophasic propylene copolymer (HECO) is above 1.8 dl/g, more preferably at least 2.0 dl/g. On the other hand, the intrinsic viscosity (IV) should be not too high otherwise the flowability is decreased. Thus the intrinsic viscosity of the amorphous fraction (AM) of the heterophasic propylene copolymer (HECO) is preferably in the range of 1.8 to 4.0 dl/g, more preferably in the range 2.0 to 3.6 dl/g and even more preferably in the range of 2.0 to 3.2 dl/g.

The (semicrystalline) polypropylene (PP) is preferably a (semicrystalline) random propylene copolymer (R-PP) or a (semicrystalline) propylene homopolymer (H-PP), the latter especially preferred.

The expression "propylene homopolymer" used in the instant invention relates to a polypropylene that consists substantially, i.e. of more than 99.55 mol-%, still more preferably of at least 99.70 mol-%, of propylene units. In a preferred embodiment only propylene units in the propylene homopolymer are detectable.

In case the (semicrystalline) polypropylene (PP) is a (semicrystalline) random propylene copolymer (R-PP) it is appreciated that the (semicrystalline) random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semicrystalline) random propylene copolymer (R-PP) according to this invention comprises, especially consists of, monomers co-polymerizable with propylene from the group consisting of ethylene, 1-butene and 1-hexene. More specifically the (semicrystalline) random propylene copolymer (R-PP) of this invention comprises—apart from propylene—units derivable from ethylene and/or 1-butene. In a preferred embodiment the (semicrystalline) random propylene copolymer (R-PP) comprises units derivable from ethylene and propylene only.

Additionally, it is appreciated that the (semicrystalline) random propylene copolymer (R-PP) has preferably a co-monomer content in the range of more than 0.4 to 1.5 mol-%, more preferably in the range of more than 0.3 to 1.2 mol-%, yet more preferably in the range of 0.4 to 1.0 mol-%.

The term "random" indicates that the co-monomers of the (semicrystalline) random propylene copolymers (R-PP) are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semicrystalline) polypropylene (PP) and the elastomeric propylene copolymer (EC). However, it is preferred that the heterophasic propylene copolymer (HECO) is produced in a sequential step process, using reactors in serial configuration and operating at different reaction conditions. Typically, the (semicrystalline) polypropylene (PP) is produced in at least one first reactor and subsequently the elastomeric propylene copolymer (EC) in at least one second reactor.

Further it is appreciated that the (semicrystalline) polypropylene (PP), like (semicrystalline) propylene homopolymer (H-PP), of the heterophasic propylene copolymer (HECO) has a moderate melt flow $MFR_2$ (230° C.). Thus it is preferred that the (semicrystalline) polypropylene (PP), like (semicrystalline) propylene homopolymer (H-PP), of the heterophasic propylene copolymer (HECO) has a melt flow rate $MFR_2$ (230° C.) measured according to ISO 1133 of 3.0 to 140.0 g/10 min, preferably in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min.

The term "semicrystalline" indicates that the polymer is not amorphous. Accordingly, it is preferred that the semicrystalline polypropylene (PP) according to this invention has a xylene soluble fraction (XCS) of not more than 10 wt.-%, in case of a (semicrystalline) propylene homopolymer (H-PP) the xylene soluble fraction (XCS) is even lower, i.e. not more than 6.0 wt.

Accordingly, it is preferred that the (semicrystalline) propylene homopolymer (H-PP) has a xylene soluble fraction (XCS) of below 5.0 wt.-%, more preferably in the range of 0.5 to 4.5, like in the range of 1.0 to 3.5 wt.-%.

Preferably the (semicrystalline) polypropylene (PP) according to this invention has a melting temperature Tm above 135° C., more preferably above 140° C. In case of the (semicrystalline) propylene homopolymer (H-PP) the melting temperature Tm is above 150° C., like at least 156° C. Upper ranges are not more than 168° C., like not more than 167° C.

The second component of the heterophasic propylene copolymer (HECO) is the elastomeric propylene copolymer (EC).

Preferably said elastomeric propylene copolymer (EC) comprises units derived from
propylene and
ethylene and/or $C_4$ to $C_{12}$ α-olefin.

The elastomeric propylene copolymer (EC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (EC) may additionally contain units derived from a conjugated diene, like butadiene, or a non-conjugated diene, however it is preferred that the elastomeric propylene copolymer (EC) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1, 4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly, the elastomeric propylene copolymer (EC) comprises at least units derivable from propylene and ethylene and may comprise other units derivable from a further α-olefin as defined in the previous paragraph. However, it is in particular preferred that elastomeric propylene copolymer (EC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (EC) is especially preferred, the latter most preferred.

In the present invention the content of units derivable from propylene in the elastomeric propylene copolymer (EP) equates largely with the content of propylene detectable in the xylene cold soluble (XCS) fraction. Accordingly, the comonomer content, like the ethylene content, of the elastomeric propylene copolymer (EC) is in the range of 30.0 to 60 mol.-%, more preferably in the range of 35.0 to 55.0 mol.-%, still more preferably in the range of 38.0 to 54.0 mol.-%, yet more preferably in the range of 40.0 to 52.0 mol.-%, based on the elastomeric propylene copolymer (EC).

As mentioned above the heterophasic propylene copolymer (HECO) can be produced by blending the (semicrystalline) polypropylene (PP) and the elastomeric propylene copolymer (EC). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO) according to this invention is preferably produced in a sequential polymerization process, i.e. in a multistage process, known in the art, wherein the (semicrystalline) polypropylene (PP) is produced at least in one slurry reactor, preferably in a slurry reactor and optionally in a subsequent gas phase reactor, and subsequently the elastomeric propylene copolymer (EC) is produced at least in one, i.e. one or two, gas phase reactor(s).

Accordingly, it is preferred that the heterophasic propylene copolymer (HECO) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the (semicrystalline) polypropylene (PP), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semicrystalline) polypropylene (PP), i.e. the matrix of the heterophasic propylene copolymer (HECO),
(d) transferring the (semicrystalline) polypropylene (PP) of step (c) into a third reactor (R3),
(e) polymerizing in the third reactor (R3) and in the presence of the (semicrystalline) polypropylene (PP) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the (semicrystalline) polypropylene (PP),
(f) transferring the (semicrystalline) polypropylene (PP) in which the first elastomeric propylene copolymer fraction is dispersed in a fourth reactor (R4), and
(g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the first and the second elastomeric propylene copolymer fraction form together the elastomeric propylene copolymer (EC);
the (semicrystalline) polypropylene (PP) and the elastomeric propylene copolymer (EC) form the heterophasic propylene copolymer (HECO).

Of course, in the first reactor (R1) the second polypropylene fraction can be produced and in the second reactor (R2) the first polypropylene fraction can be obtained. The same holds true for the elastomeric propylene copolymer phase. Accordingly, in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic propylene copolymer (HECO) is produced in at least two, like three or four reactors connected in series. Accordingly, the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly, for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly, for the instant process at least four, preferably four polymerization reactors, namely two slurry reactors (SR), like two loop reactors (LR), first gas phase reactor (GPR-1) and a second gas phase reactor (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst may be a "non-phthalic" Ziegler-Natta procatalyst or a "phtalic" Ziegler-Natta procatalyst. First the "non-phthalic" Ziegler-Natta procatalyst is described, subsequently the phtalic" Ziegler-Natta procatalyst The "non-phthalic" Ziegler-Natta procatalyst comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the "non-phthalic" Ziegler-Natta procatalyst is fully free of undesired phthalic compounds.

Further, the "non-phthalic" Ziegler-Natta procatalyst is free of any external support material, like silica or $MgCl_2$, but the catalyst is self-supported.

The "non-phthalic" Ziegler-Natta procatalyst can be further defined by the way as obtained. Accordingly, the "non-phthalic" Ziegler-Natta procatalyst is preferably obtained by a process comprising the steps of
a)
$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
or
$a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
or
$a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium;
and
b) adding said solution from step a) to at least one compound (TC) of a transition metal of Group 4 to 6 and
c) obtaining the solid catalyst component particles,
and adding a non-phthalic internal electron donor (ID) at any step prior to step c).

The internal donor (ID) or precursor thereof is added preferably to the solution of step a).

According to the procedure above the "non-phthalic" Ziegler-Natta procatalyst can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active "non-phthalic" Ziegler-Natta procatalyst composition. Solidification (step c) of the droplets is suitably carried out by heating the emulsion to a temperature of 70 to 150° C., preferably to 80 to 110° C.

The "non-phthalic" Ziegler-Natta procatalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition, a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained "non-phthalic" Ziegler-Natta procatalyst is desirably in the form of particles having generally an average particle size range of 5 to 200 μm, preferably 10 to 100. Particles are compact with low porosity and have surface area below 20 g/m², more preferably below 10 g/m². Typically, the amount of Ti is 1 to 6 wt.-%, Mg 10 to 20 wt.-% and donor 10 to 40 wt.-% of the catalyst composition.

Detailed description of preparation of catalysts is disclosed in WO 2012/007430, EP2610271, EP 261027 and EP2610272 which are incorporated here by reference.

The "phthalic" Ziegler-Natta procatalyst is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

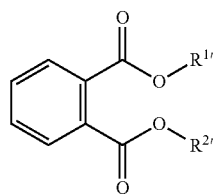

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The "phthalic" Ziegler-Natta procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier (i) a dialkylphthalate of formula (I) with $R^{1'}$ and $R^{2'}$ being independently at least a $C_5$-alkyl, like at least a $C_8$-alkyl, or preferably (ii) a dialkylphthalate of formula (I) with $R^{1'}$ and $R^{2'}$ being the same and being at least a $C_5$-alkyl, like at least a $C_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol.-%, more preferably 90 mol.-%, most preferably 95 mol.-%, of a dialkylphthalate of formula (II)

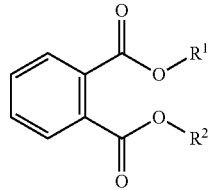

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the "phthalic" Ziegler-Natta procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the "phthalic" Ziegler-Natta procatalyst used according to the invention has been produced by using ethanol as the alcohol and dioctylphthalate (DOP) as dialkylphthalate of formula (I), yielding diethyl phthalate (DEP) as the internal donor compound.

Still more preferably the "phthalic" Ziegler-Natta procatalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst ("non-phthalic" or "phthalic") an organometallic cocatalyst as component (ii).

Accordingly, it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \quad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$].

Most preferably the external donor is dicyclopentyl dimethoxy silane [Si(OCH$_3$)$_2$(cyclo-pentyl)$_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer [HECO] according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Alternatively, the polypropylene base material (PBM) is a propylene homopolymer (hPP).

If the polypropylene base material (PBM) is a propylene homopolymer (hPP), the propylene homopolymer (hPP) is broadly understood and thus covers also embodiments in which different homopolymers are mixed. More precisely the term "propylene homopolymer (hPP)" may also cover embodiments in which two or more, like three, propylene homopolymers are mixed which differ in their melt flow rate. Accordingly, in one embodiment the term "propylene homopolymer (hPP)" covers just one propylene homopolymer with one specific melt flow rate, preferably in the range as defined below. In another embodiment the term "propylene homopolymer (hPP)" stands for a mixture of two or three, preferably two, propylene homopolymers, which differ in their melt flow rate. Preferably the two or three propylene homopolymers have a melt flow rate as in the range as defined below. According to this invention the melt flow differs from each other if the difference between the melt flow rates MFR$_2$ (230° C.) of two propylene homopolymers is at least 5 g/10 min, preferably at least 10 g/10 min, like at least 15 g/10 min.

The expression "propylene homopolymer (hPP)" as used herein relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

The propylene homopolymer (hPP) according to this invention must have a melt flow rate MFR$_2$ (230° C.) in the range of 3.0 to 140.0 g/10 min. Preferably, the propylene homopolymer (hPP) has a melt flow rate MFR$_2$ (230° C., 2.16 kg) in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min.

The propylene homopolymer (hPP) is preferably an isotactic propylene homopolymer. Accordingly, it is appreciated that the propylene homopolymer (hPP) has a rather high pentad concentration, i.e. higher than 90 mol-%, more preferably higher than 92 mol-%, still more preferably higher than 93 mol-% and yet more preferably higher than 95 mol-%, like higher than 99 mol-%.

Preferably the propylene homopolymer (hPP) has a melting temperature Tm measured according to ISO 11357-3 of at least 150° C., more preferably of at least 155° C., more preferably in the range of 150 to 168° C., still more preferably in the range of 155 to 167° C. and most preferably in the range of 160 to 167° C.

Further the propylene homopolymer (hPP) has a rather low xylene cold soluble (XCS) content, i.e. below 4.5 wt.-%, more preferably below 4.0 wt.-%, yet more preferably below 3.7 wt.-%. Thus it is appreciated that the xylene cold soluble (XCS) content is in the range of 0.5 to 4.5 wt.-%, more preferably in the range of 1.0 to 4.0 wt.-%, yet more preferably in the range of 1.5 to 3.5 wt.-%.

Additionally or alternatively, the propylene homopolymer (hPP) has a density in the range of 850 to 1 000 kg/cm$^3$, more preferably in the range of 875 to 950 kg/m$^3$, yet more preferably in the range of 890 to 925 kg/cm$^3$.

In one embodiment, the propylene homopolymer (hPP) has a Charpy notched impact strength at 23° C. ISO 179-1eA in the range from 0.5 to 10.0 kJ/m$^2$, preferably from 0.6 to 8.0 kJ/m$^2$ and most preferably from 0.8 to 5.0 kJ/m$^2$.

The propylene homopolymer (H-PP) suitable in the inventive composite is available from a wide variety of commercial sources and can be produced as known from the art. For instance, the propylene homopolymer (hPP) can be produced in the presence of a single-site catalyst or a Ziegler-Natta catalyst, the latter being preferred.

The polymerization of the propylene homopolymer (hPP) can be a bulk polymerization, preferably performed in a so-called loop reactor. Alternatively, the polymerization of the propylene homopolymer (hPP) is a two stage or more stage polymerization performed in a combination of a loop reactor operating in slurry phase and one or more gas phase reactors as for instance applied in the Borstar® polypropylene process.

Preferably, in the process for producing the propylene homopolymer (hPP) as defined above the conditions for the bulk reactor of step may be as follows:
the temperature is within the range of 40° C. to 110° C., preferably between 60° C. and 100° C., 70 to 90° C.,
the pressure is within the range of 20 bar to 80 bar, preferably between 30 bar to 60 bar, hydrogen can be added for controlling the molar mass in a manner known per se.

Subsequently, the reaction mixture from the bulk (bulk) reactor can be transferred to the gas phase reactor, whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

As mentioned above, the propylene homopolymer (hPP) is preferably obtained using a Ziegler-Natta system.

Accordingly the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane, diethyl-amino triethoxy silane or cyclohexyl methyldimethoxy silane.

If desired the Ziegler-Natta catalyst system is modified by polymerizing a vinyl compound in the presence of the catalyst system, wherein the vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms. The so modified catalyst is used if desired for the preparation of the propylene homopolymer (hPP) to accomplish α-nucleation of the polymer, the composition (Co) and thus of the total molded article (BNT-technology).

One embodiment of a process for the propylene homopolymer (hPP), as discussed above, is a loop phase process or a loop-gas phase process, such as developed by Borealis, known as Borstar® technology, described for example in EP 0 887 379 A1 and WO 92/12182.

The Cellulose-Based Fiber (CF)

The composite of the present invention must comprise cellulose-based fiber (CF). The cellulose-based fiber (CF) can be reinforcing (high aspect ratio) fiber or non-reinforcing (low aspect ratio). Aspect ratio is defined as the ratio of the length to the effective diameter of the fiber particle. Preferably the cellulose-based fiber (CF) has an aspect ratio in the range of 2.0 to 13.0, more preferably in the range of 2.5 to 7.0, yet more preferably in the range of 3.0 to 5.0.

Preferably the cellulose-based fiber (CF) has a volume moment mean (D[4.3]) diameter between 1 and 1 200 μm, more preferably between 40 to 1 000 μm, yet more preferably between 100 to 600 μm.

The cellulose may be derived from any source, including wood/forest and agricultural by-products. Accordingly the cellulose-based fiber (CF) is preferably selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, carboxymethyl cellulose (CMC), and any mixtures thereof. The cellulose-based fiber (CF) is in particular selected from the group consisting wood flour, paper, pulp, raw cellulose and cellulose. Most preferably the cellulose-based fiber (CF) is wood flour.

The Polymer-Based Fiber (PF)

The composite of the present invention must comprise a polymer-based fiber (PF) having a melting temperature of ≥210° C.

It is appreciated that the polymer-based fiber (PF) typically imparts improved elongation at break and/or impact strength to the composite of the present invention, especially compared to a composite comprising a cellulose-based fiber (CF) as reinforcing fiber material only.

The term "polymer-based fiber (PF)" in the meaning of the present application refers to a fiber that is not cellulose-based. That is to say, the polymer-based fiber (PF) differs from the cellulose-based fiber (CF). Furthermore, the term "polymer-based fiber (PF)" in the meaning of the present application refers to a fiber that is not a polypropylene, like polypropylene fiber.

It is one specific requirement that the polymer-based fiber (PF) has a melting temperature Tm of ≥210° C. Preferably, the polymer-based fiber (PF) has a melting temperature Tm in the range of 210 to 350° C., more preferably in the range of 210 to 300° C.

Thus, the melting temperature Tm according to ISO 11357-3 of the polymer-based fiber (PF) is ≥42° C., preferably from 42 to 200° C., above the melting temperature Tm according to ISO 11357-3 of the polypropylene base material. More preferably, the melting temperature Tm according to ISO 11357-3 of the polymer-based fiber (PF) is ≥50° C., even more preferably from 50 to 200° C. and most preferably from 50 to 180° C., e.g. from 50 to 120° C., above the melting temperature Tm according to ISO 11357-3 of the polypropylene base material.

In one embodiment, the polymer-based fiber (PF) has an average fiber length of from 0.2 to 20 mm and most preferably of 0.5 to 20 mm.

Additionally or alternatively, the polymer-based fiber (PF) has an average diameter of from 10 to 30 μm, preferably from 12 to 28 μm.

In one embodiment, the polymer-based fiber (CF) has a tenacity of at least 3.0 cN/dtex up to 17 cN/dtex and most preferably of at least 4.0 cN/dtex up to 17 cN/dtex.

Additionally or alternatively, the polymer-based fiber (CF) preferably has a Young Modulus in the range of 3.0 to 35 N/tex and most preferably in the range from 3.0 to 30 N/tex (ISO 5079).

For example, the polymer-based fiber (CF) is selected from a poly vinyl alcohol (PVA) fiber, a polyethylene terephthalate (PET) fiber, a polyamide (PA) fiber and mixtures thereof. Preferably, the polymer-based fiber (CF) is a polyethylene terephthalate (PET) fiber or a poly vinyl alcohol (PVA) fiber. Most preferably, the polymer-based fiber (CF) is a polyethylene terephthalate (PET) fiber.

PVA fibers are well known in the art and are preferably produced by a wet spinning process or a dry spinning process.

PVA itself is synthesized from acetylene [74-86-2] or ethylene [74-85-1] by reaction with acetic acid (and oxygen in the case of ethylene), in the presence of a catalyst such as zinc acetate, to form vinyl acetate [108-05-4] which is then polymerized in methanol. The polymer obtained is subjected to methanolysis with sodium hydroxide, whereby PVA precipitates from the methanol solution.

PVA used for the manufacture of fibers generally has a degree of polymerization of not less than 1 000, preferably not less than 1200 and more preferably not less than 1 500. Most preferably the PVA has a degree of polymerization of around 1 700, e.g. 1 500 up to 2 000.

The degree of hydrolysis of the vinyl acetate is generally at least 99 mol %.

The mechanical properties of PVA fibers vary depending on the conditions of fiber manufacture such as spinning process, drawing process, and acetalization conditions, and the manufacture conditions of raw material PVA.

The PVA fibers can be in the form of (multi)filaments or staple fibers.

PVA fibers are characterized by high strength, low elongation, and high modulus. Suitable PVA fibers preferably have a tenacity of from 3.0 cN/dtex to 17.0 cN/dtex, more preferably from 4.0 cN/dtex to 17.0 cN/dtex, even more preferably from 6.0 cN/dtex to 14.0 cN/dtex and most preferably from 7.0 cN/dtex to 13.0 cN/dtex.

Furthermore, such PVA fibers preferably have a Young Modulus in the range of 3.0 to 35.0 N/tex, preferably in the range of 10.0 to 30.0 N/tex and more preferably in the range of 15.0 to 25.0 N/tex (ISO 5079).

PVA fibers being suitable for the present invention have an an average fiber length of from 0.2 to 20 mm and most preferably of 0.5 to 20 mm.

The fiber average diameter of suitable PVA fibers is in the range of 10 to 30 µm, preferably in the range of 12 to 28 µm, more preferably in the range of 12 to 24 µm, even more preferably in the range of 12 to 20 µm and most preferably in the range of 12 to 18 µm.

In one embodiment, the PVA fibers have a density in the range of 1 100 to 1 400 kg/m$^3$, preferably in the range of 1 200 to 1 400 kg/m$^3$.

PVA fibers being suitable for the present invention are furthermore surface treated with a so called sizing agent. This can be done with known methods, like for example immersing the fibers in a tank in which a sizing agent is placed, being nipped and then drying in a hot-air oven, or with a hot roller or a hot plate.

Example of sizing agents include polyolefin resin, polyurethane resin, polyester resin, acrylic resin, epoxy resin, starch, vegetable oil, modified polyolefin. The amount of the sizing agent related to the polyvinyl alcohol fibers is within the common knowledge of a skilled person and can be, for example in the range of from 0.1 to 10 parts by weight of the sizing agent with respect to 100 parts by weight of the polyvinyl alcohol fiber.

A surface treating agent may be incorporated in the sizing agent to improve the wettability or adhesiveness between the polyvinyl alcohol fibers and the polypropylene composition.

Examples of the surface treating agent include silane coupling agents, titanate coupling agents, aluminum coupling agents, chromium coupling agents, zirconium coupling agents, borane coupling agents, and preferred are silane coupling agents or titanate coupling agents, and more preferably silane coupling agents.

The PET fibers can be in the form of (multi)filaments or staple fibers.

PET fibers are characterized by high strength, low elongation, and high modulus. Suitable PET fibers preferably have a tenacity of from 3.0 cN/dtex to 17.0 cN/dtex, more preferably from 3.0 cN/dtex to 13.0 cN/dtex, even more preferably from 4.0 cN/dtex to 11.0 cN/dtex and most preferably from 5.0 cN/dtex to 9.0 cN/dtex.

Furthermore, such PET fibers preferably have a Young Modulus in the range of 3.0 to 35 N/tex, preferably in the range from 3.0 to 17 N/tex, more preferably in the range of 5.0 to 15 N/tex and most preferably in the range of 6 to 12 N/tex (ISO 5079).

PET fibers being suitable for the present invention have an average fiber length of from 0.2 to 20 mm and most preferably of 0.5 to 20 mm.

The fiber average diameter of suitable PET fibers is in the range of 10 to 30 µm, preferably in the range of 12 to 28 µm, and most preferably in the range of 12 to 26 µm.

In one embodiment, the PET fibers have a density in the range of 1 100 to 1 400 kg/m$^3$, preferably in the range of 1 200 to 1 400 kg/m$^3$.

The Adhesion Promoter (AP)

To improve compatibility between the polypropylene base material, i.e. the heterophasic propylene copolymer (HECO) or the propylene homopolymer (hPP), and the cellulose-based fiber (CF) and the polymer-based fiber (PF) an adhesion promoter (AP) can be used.

The adhesion promoter (AP) preferably comprises, more preferably is, a modified (functionalized) polymer and optionally a low molecular weight compound having reactive polar groups.

Modified alpha-olefin polymers, in particular propylene homopolymers and copolymers, like copolymers of ethylene and propylene with each other or with other alpha-olefins, are most preferred, as they are highly compatible with the polymer of the present composite. Modified polyethylene and modified styrene block copolymers, like modified poly (styrene-b-butadiene-b-styrene) (SBS) or poly(styrene-b-(ethylene-cobutylene)-b-styrene) (SEBS), can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to maleic anhydride functionalized polypropylene as adhesion promoter (AP).

The amounts of groups deriving from polar groups, e.g. maleic anhydride, in the modified polymer, like the modified polypropylene, are preferably from 0.1 to 5.0 wt.-%, more preferably from 0.2 to 5.0 wt.-%, and most preferably from 0.3 to 4.0 wt.-%, such as from 0.4 to 3.0 wt.-%, based on the total weight of the polar modified polymer.

Particular preference is given to an adhesion promoter (AP) being a modified propylene copolymer or, a modified propylene homopolymer the latter is especially preferred.

In one embodiment the adhesion promoter (AP) is a modified (random) propylene copolymer containing polar groups as defined above. In one specific embodiment the adhesion promoter (AP) is a (random) propylene copolymer grafted with maleic anhydride. Thus in one specific preferred embodiment the adhesion promoter (AP) is a (random) propylene ethylene copolymer grafted with maleic anhydride, more preferably wherein the ethylene content based on the total amount of the random propylene ethylene copolymer is in the range of 1.0 to 8.0 wt.-%, more preferably in the range of 1.5 to 7.0 wt.-%.

Required amounts of groups deriving from polar groups in the polar modified (random) propylene copolymer or in the modified propylene homopolymer are preferably from 0.1 to 5.0 wt.-%, more preferably from 0.2 to 5.0 wt.-%, and most preferably from 0.3 to 4.0 wt.-%, such as from 0.4 to 3.0 wt.-%, based on the total weight of the polar modified (random) propylene copolymer.

Preferred values of the melt flow rate $MFR_2$ (190° C.; 2.1 kg) measured according to ISO 1133 for the adhesion promoter (AP) are from 1.0 to 500.0 g/10 min, like in the range of 1.0 to 150.0 g/10 min. For example, the melt flow rate $MFR_2$ (190° C.; 2.1 kg) measured according to ISO 1133 for the adhesion promoter (AP) are from 10.0 to 100.0 g/10 min, like in the range of 10.0 to 50.0 g/10 min.

The modified polymer, i.e. the adhesion promoter (AP), can be produced in a simple manner by reactive extrusion of the polymer, for example with maleic anhydride in the presence of free radical generators (like organic peroxides), as disclosed for instance in EP 0 572 028.

The adhesion promoter (AP) is known in the art and commercially available. A suitable example is SCONA TPPP 6102 GA or SCONA TPPP 8112 FA of BYK.

The Alpha Nucleating Agent (NU)

According to this invention the alpha nucleating agent (NU) does not belong to the class of additive (A) as defined below.

The composite may contain an alpha nucleating agent (NU). Even more preferred the present invention is free of beta nucleating agents. Accordingly, the alpha nucleating agent (NU) is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Preferably the composite contains as alpha nucleating agent a vinylcycloalkane polymer and/or a vinylalkane polymer. This alpha nucleating agent (NU) is included as described above, namely due to the preparation of the heterophasic propylene copolymer (HECO).

Such additives and nucleating agents are generally commercially available and are described, for example, in "Plastic Additives Handbook", 5th edition, 2001 of Hans Zweifel.

The Additives (A)

The composite of the present invention may comprise additives (A). Typical additives are acid scavengers, anti-oxidants, colorants, light stabilisers, plasticizers, slip agents, anti-scratch agents, dispersing agents, processing aids, lubricants, and pigments.

Such additives are commercially available and for example described in "Plastic Additives Handbook", $6^{th}$ edition 2009 of Hans Zweifel (pages 1141 to 1190).

Furthermore, the term "additives" according to the present invention also includes carrier materials, in particular polymeric carrier materials (PCM), as defined below.

Preferably the composite does not comprise (a) further polymer(s) different to the polymer(s) comprised in the composite, i.e. the polypropylene base material, the cellulose-based fiber (CF), the polymer-based fiber (PF) and the optional adhesion promoter (AP), in an amount exceeding 10 wt.-%, preferably exceeding 5 wt.-%, based on the weight of the composite. If an additional polymer is present, such a polymer is typically a polymeric carrier material (PCM) for the additives (A).

It is appreciated that the composite comprises polymeric carrier material (PCM) in an amount of not more than 10.0 wt.-%, preferably in an amount of not more than 5.0 wt.-%, more preferably in an amount of not more than 2.5 wt.-%, like in the range of 1.0 to 10.0 wt.-%, preferably in the range of 1.0 to 5.0 wt.-%, even more preferably in the range of 1.0 to 2.5 wt.-%, based on the total weight of the composite.

The polymeric carrier material (PCM) is a carrier polymer for the additives (A) to ensure a uniform distribution in the composite. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

According to a preferred embodiment the polymeric carrier material (PCM) is a polypropylene homopolymer.

The Process

According to another aspect, the present invention is directed to a process for the preparation of a composite as defined herein, comprising the steps of:

a) providing a polypropylene base material (PBM), b) providing a cellulose-based fiber (CF), c) providing a polymer-based fiber (PF), d) melt-blending the cellulose-based fiber (CF) of step b) with the polypropylene base material (PBM) of step a) such as to obtain a cellulose-based fiber reinforced polypropylene base material, e) impregnating the polymer-based fiber (PF) of step c) with the polypropylene base material (PBM) of step a) such as to obtain a polymer-based fiber reinforced polypropylene base material, f) blending the cellulose-based fiber reinforced polypropylene base material obtained in step d) and the polymer-based fiber reinforced polypropylene base material obtained in step e), and g) injection molding the blend obtained in step f), wherein step e) is carried out by pultrusion.

With regard to the definition of the polypropylene base material (PBM), the cellulose-based fiber (CF), the polymer-based fiber (PF) and preferred embodiments thereof, reference is further made to the statements provided above when discussing the technical details of the composite of the present invention.

Thus, in one embodiment the composite having an elongation at break in the range from 2.5 to 7.5%, the composite comprising a) 25 to 92.5 wt.-%, based on the total weight of the composite, of a polypropylene base material (PBM) having a melt flow rate $MFR_2$ (230° C., 2.16 kg) measured according to ISO 1133 in the range of from 3.0 to 140.0 g/10 min, wherein the polypropylene base material (PBM) is i) a heterophasic propylene copolymer (HECO) comprising a (semicrystalline) polypropylene (PP) as a matrix in which an elastomeric propylene copolymer (EC) is dispersed; or ii) a propylene homopolymer (hPP); and b) 5 to 50 wt.-%, based on the total weight of the composite, of a cellulose-based fiber (CF); and c) 2.5 to 25 wt.-%, based on the total weight of the composite, of a polymer-based fiber (PF) having a melting temperature of ≥210° C., wherein the weight ratio of the cellulose-based fiber (CF) and the polymer-based fiber (PF) [(CF)/(PF)] is at least 2:1;

is obtainable by a process comprising the steps of:

a) providing a polypropylene base material (PBM), b) providing a cellulose-based fiber (CF), c) providing a polymer-based fiber (PF), d) melt-blending the cellulose-based fiber (CF) of step b) with the polypropylene base material (PBM) of step a) such as to obtain a cellulose-based fiber reinforced polypropylene base material, e) impregnating the polymer-based fiber (PF) of step c) with the polypropylene base material (PBM) of step a) such as to obtain a polymer-based fiber reinforced polypropylene base material, f) blending the cellulose-based fiber reinforced polypropylene base material obtained in step d) and the polymer-based fiber reinforced polypropylene base material obtained in step e), and g) injection molding the blend obtained in step f), wherein step e) is carried out by pultrusion.

It is preferred that process step d) is carried out by extrusion. In particular, it is to be noted that process step d) can be carried out by any extrusion method well known and commonly used in the composite art. For example, process step d) is carried out in a twin-screw extruder with a temperature profile between 170 and 210° C.

It is appreciated that process step e) is carried out by pultrusion. In particular, it is to be noted that process step e) can be carried out by any pultrusion process well known and commonly used in the composite art. For example, process step e) is carried out in a pultrusion process with a temperature profile between 140 and 210° C.

Preferably, process step e) is carried out in that the polymer-based fiber (PF) is impregnated with the polypropylene base material (PBM) in a pultrusion process and then the obtained strands are cut in a pelletiser to specific lengths.

In one embodiment, process step e) comprises impregnating and coating the polymer-based fiber (PF) of step c) with the polypropylene base material (PBM) of step a). It is appreciated that impregnating and coating can be carried out with the same or different polypropylene base material (PBM). That is to say, impregnating and coating in step e) can be carried out with the same heterophasic propylene copolymer (HECO) or propylene homopolymer (hPP). Alternatively, impregnating and coating in step e) can be carried out with a different heterophasic propylene copolymer (HECO) or propylene homopolymer (hPP). In one embodiment, impregnating and coating in step e) are carried out in that a heterophasic propylene copolymer (HECO) is used as the polypropylene base material (PBM) for impregnating and in that a propylene homopolymer (hPP) is used as the polypropylene base material (PBM) for coating or vice versa.

If process step e) comprises impregnating and coating the polymer-based fiber (PF) of step c) with the polypropylene base material (PBM) of step a), impregnating is preferably carried out before coating. It is preferred that the amount of the impregnation polymer, i.e. the polypropylene base material (PBM), is below the amount of the coating polymer, i.e. the polypropylene base material (PBM).

Further details about the pultrusion process are disclosed in EP 1364760 B1, which content is thus herewith incorporated by reference in the present application.

Thus, process step e) is preferably carried out in that the polymer-based fiber (PF) is impregnated and coated with the polypropylene base material (PBM) in a pultrusion process and then the obtained strands are cut in a pelletiser to specific lengths.

For example, it is appreciated that process step d) is carried out by extrusion, preferably in a twin screw extruder, and process step e) is carried out by pultrusion.

The pultrusion in process step e) has the advantage that the fibers are typically arranged parallel in the pellets obtained in process step e), preferably all fibers in the pellets obtained in process step e) are of the same length.

It is to be noted that the polypropylene base material (PBM) used in process steps d) and e) can be the same or different. That is to say, process steps d) and e) can be carried out with the same heterophasic propylene copolymer (HECO) or propylene homopolymer (hPP). Alternatively, process steps d) and e) can be carried out with a different heterophasic propylene copolymer (HECO) or propylene homopolymer (hPP). In one embodiment, process steps d) and e) are carried out in that a heterophasic propylene copolymer (HECO) is used as the polypropylene base material (PBM) in step d) and in that a propylene homopolymer (hPP) is used as the polypropylene base material (PBM) in step e) or vice versa.

In order to obtain a composite having an exceptional good impact strength, it is preferred that the polymer-based fiber (PF) of step c) is provided in continuous form, e.g. in the shape of an endless roving. In contrast thereto, the cellulose-based fiber (CF) is preferably provided as chopped fiber in the desired dimension.

Preferably, in impregnating step e) the polymer-based fiber (PF) in continuous form, e.g, in the shape of an endless roving, is impregnated with the polypropylene base material (PBM) thereby forming a strand of polymer-based fiber reinforced polypropylene base material and subsequently cutting the strand into pellets.

It is appreciated that the provision of the polymer-based fiber (PF) in continuous form, e.g, in the shape of an endless roving, in impregnating step e) has the advantage that pellets are obtained having a fiber content of from 2 to 30 vol.-% and where the pellets—in a cross-sectional view—have a two layer-structure, preferably a core-shell-structure, where the inner layer is comprised of the polymer-based fiber (PF) being impregnated with the polypropylene base material (PBM).

In one embodiment, the pellets obtained in process step e) preferably have an average length of from 2.0 to 20 mm, preferably of 2.5 to 20 mm and most preferably from 3.5 to 20 mm. As the length of the pellet correspond to the length of the polymer-based fiber (PF) in the pellets obtained in process step e), the polymer-based fibers (PF) in the pellets have an average fiber length of from 2.0 to 20 mm, preferably of 2.5 to 20 mm and most preferably from 3.5 to 20 mm.

For example, the PVA fibers in the pellets obtained in process step e) have average fiber length of 2.0 to 20 mm, preferably of 2.5 to 19 mm, more preferably from 3.0 to 18 mm and most preferably from 3.5 to 17 mm. The PVA fibers in the pellets obtained in process step e) preferably have average fiber length of 2.0 to 20 mm, preferably of 2.5 to 19 mm, more preferably from 3.0 to 18 mm and most preferably from 3.5 to 17 mm.

Preferably the polymer-based fibers (PF) in the pellets obtained in process step e) have an aspect ratio in the range of 100.0 to 2 000.0.

Thus, in process step d) a cellulose-based fiber reinforced polypropylene base material is obtained, preferably in form of pellets. In process step e) a polymer-based fiber reinforced polypropylene base material is obtained, preferably in form of pellets.

The cellulose-based fiber reinforced polypropylene base material obtained in step d), preferably in form of pellets, and the polymer-based fiber reinforced polypropylene base material obtained in step e), preferably in form of pellets, are blended such as to obtain a blend of the cellulose-based fiber reinforced polypropylene base material and the polymer-based fiber reinforced polypropylene base material. In particular, it is to be noted that blending step f) can be carried out by any blending method well known and commonly used in the art, e.g. in a mixer or extruder.

For example, the cellulose-based fiber reinforced polypropylene base material obtained in step d), preferably in form of pellets, and the polymer-based fiber reinforced polypropylene base material obtained in step e), preferably in form of pellets, are blended by dry-blending. In particular, it is to be noted that the dry-blending can be carried out by any dry-blending method well known and commonly used in the art, e.g. in a mixer or extruder. It is appreciated that the dry-blending of the cellulose-based fiber reinforced polypropylene base material with the polymer-based fiber reinforced polypropylene base material is carried out before injection molding step g). In this embodiment, process steps f) and g) are thus carried out separately.

Alternatively, the cellulose-based fiber reinforced polypropylene base material obtained in step d), preferably in form of pellets, is diluted with the polymer-based fiber reinforced polypropylene base material obtained in step e), preferably in form of pellets, during injection molding step g). It is appreciated that the blending of the cellulose-based fiber reinforced polypropylene base material with the polymer-based fiber reinforced polypropylene base material is thus carried out during injection molding step g). In this embodiment, process steps f) and g) are carried out simultaneously.

Thus, it is appreciated that process steps f) and g) can be carried out separately or simultaneously.

If process steps f) and g) are carried out simultaneously, the weight ratio of the cellulose-based fiber (CF) to the polymer-based fiber (PF) can be adjusted via gravimetric scales.

In particular, it is to be noted that injection molding step g) can be carried out by any injection molding method well known and commonly used in the art, e.g. in an injection molding machine. For example, process step g) is carried out at a temperature between 140 and 200° C.

The Article/the Use

The composite of the present invention is preferably used for the production of molded articles, preferably injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, like injection molded articles, comprising, preferably comprising at least 60 wt.-%, more preferably at least 80 wt.-%, yet more preferably at least 95 wt.-%, like consisting of, the inventive composite.

Accordingly, the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composite.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C$ $\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C$ {H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ {$^{1}H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E\ [mol\ \%]=100*fE$$

The weight percent comonomer incorporation was calculated from the mole fraction:

$$E\ [wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method $C_2$ in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

Density is measured according to ISO 1183-1—method A (2004). Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 5 kg or 2.1 kg load).

The xylene cold solubles (XCS, wt.-%): Content of xylene cold solubles (XCS) is determined at 25° C. according to ISO 16152; first edition; 2005-07-01

The amorphous content (AM) is measured by separating the above xylene cold soluble fraction (XCS) and precipitating the amorphous part with acetone. The precipitate was filtered and dried in a vacuum oven at 90° C.

$$AM\% = \frac{100*m1*v0}{m0*v1}$$

wherein

"AM %" is the amorphous fraction,

"m0" is initial polymer amount (g)

"m1" is weight of precipitate (g)

"v0" is initial volume (ml)

"v1" is volume of analyzed sample (ml)

Intrinsic viscosity is measured according to DIN ISO 1628/1, October 1999 (in Decalin at 135° C.).

Charpy notched impact strength is determined according to ISO 179/1eA at 23° C. and at −20° C. by using injection moulded test specimens of 80×10×4 $mm^3$ prepared in accordance with EN ISO 19069-2.

Charpy unnotched impact strength is determined according to ISO 179/1eU at 23° C. by using injection moulded test specimens of 80×10×4 $mm^3$ prepared in accordance with EN ISO 19069-2.

Tensile Modulus is measured according to ISO 527-3 (cross head speed=1 mm/min; 23° C.) using injection molded specimens as described in EN ISO 1873-2 (dog bone shape, 4 mm thickness).

Elongation at yield is measured according to ISO 527-3 (cross head speed=50 mm/min; 23° C.) using injection molded specimens as described in EN ISO 1873-2 (dog bone shape, 4 mm thickness).

Tensile strength is measured according to ISO 527-2 (cross head speed=50 mm/min; 23° C.) using injection molded specimens as described in EN ISO 1873-2 (dog bone shape, 4 mm thickness).

Elongation at break is measured according to ISO 527-4 (cross head speed=50 mm/min; 23° C.) using injection molded specimens as described in EN ISO 1873-2 (dog bone shape, 4 mm thickness).

Average fiber diameter and average fiber length were determined by using a light microscopy. Samples were embedded in Struers CaldoFix resin under vacuum.

Abrasion/polishing was performed on a Struers LaboPol-5 machine, employing grinding media with particles sizes down to 0.04 μm. The samples thus prepared were analyzed using an Olympus optical microscope in brightfield mode. The dimensions of the fiber cross-sections of the fibers in the matrix were measured to get the average fiber-diameter (typically around 30 individual fibers were measured and the shortest dimension of the fiber cross-section was used to get the fiber diameter). In contrast, the average fiber length was measured on around 30 individual pellets and the longest dimension of the pellet was used to get the average fiber length.

The particle size and particle size distribution of the cellulose-based fibers (CF), like wood flour fibers were determined by a Horiba Partica LA 950 V2 (Horiba Co., Japan) laser diffraction particle size analyzer equipped with an automated dry powder dispersion unit. Three parallel measurements were carried out and the result given is their average. The volume moment mean (D[4.3]) was calculated and used as mean particle size of cellulose-based fibers (CF), like the wood flour fibers.

The aspect ratio of the cellulose-based fibers (CF), like wood flour fibers was determined with the help of scanning electron microscopy (SEM). The SEM micrographs were taken by a Jeol JSM 6380 LA apparatus. The particles on the SEM micrographs were measured with the help of image analysis software (Image Pro Plus) and the length and diameter of the particles were measured individually by hand. At least 500 particles were analyzed on several micrographs in order to lower the standard deviation of the evaluation and aspect ratio was calculated thereof.

Heat deflection temperature (HDT) A is determined according to ISO 75-2 at 0.45 MPa.

2. Examples

Composites were prepared using the components in the amounts as indicated in table 1 below and as explained further below. Pellets of the cellulose-based fiber (CF) composition DIL1 were prepared by compounding in a parallel, co-rotating twin screw extruder Brabender DSE20, coupled to an ECON EUP50 underwater pelletizer (UP). The DSE20 has a screw diameter (d) of 20 mm, and a length of 800 mm (40d). Pellets of the polymer-based fiber (PF) compositions DIL2, DIL3 and DIL4 were prepared by impregnating and coating endless multifilament fibers in a pultrusion process. The impregnating and coating is carried out at a temperature not exceeding 210° C.

TABLE 1

| | | Examples | | | |
|---|---|---|---|---|---|
| Example | | DIL1 | DIL2 | DIL3 | DIL4 |
| hPP | [wt.-%] | 66.9 | 75.1 | 62.3 | 86.6 |
| CF | [wt.-%] | 30.4 | — | — | — |
| PF1 | [wt.-%] | — | 24.9 | 37.7 | — |
| PF2 | [wt.-%] | — | — | — | 13.4 |
| AP | [wt.-%] | 2.7 | | | |
| Density | [kg/m$^3$] | 1010 | 990 | 1040 | 950 |
| Tensile modulus | [MPa] | 3734 | 2254 | 2470 | 3394 |
| Tensile strength | [MPa] | 39.8 | 51.5 | 47.4 | 41.0 |
| Tensile Elongation at yield | [%] | 2.9 | 24.4 | 22.5 | 5.9 |
| Tensile Elongation at break | [%] | 3.2 | 25.7 | 23.5 | 6.0 |
| NIS (23° C.) | [kJ/m$^2$] | 2.4 | 70.6 | 94.6 | 51.5 |
| NIS (−20° C.) | [kJ/m$^2$] | 1.8 | 66.4 | 38.5 | 42.4 |
| UNIS (23° C.) | [kJ/m$^2$] | 12.3 | 105.4 | 186.4 | 61.9 |
| HDT A (0.45 Mpa) | [° C.] | 106.1 | 79.3 | 90.0 | 72.7 |

"hPP" is the commercial polypropylene homopolymer "HJ120UB" containing nucleating and antistatic additives, provided by Borealis. This polymer is a CR (controlled rheology) grade with narrow molecular weight distribution, density of 905 kg/m$^3$ (ISO 1183) and an MFR$_2$ of 75 g/10 min (230° C.; 2.16 kg; ISO 1133); XCS of 2.2 wt.-% and melting temperature of 164° C. and a Charpy Notched Impact Strength at 23° C. of 1.0 kJ/m$^2$.

"CF" is the commercial cellulosic product Arbocel C320 of Rettenmaier und Söhne having a volume moment mean (D[4.3]) diameter of 467 μm and an aspect ratio of 4.

"PF1" is the commercial endless multifilament yarn on bobbins PET T715 11000 dtex, tenacity of 7.45 cN/dtex, elongation at break 13%, with a specific surface-treatment for PP, supplied by DuraFiber Technologies.

"PF2" is the commercial endless multifilament yarn on bobbins PVA-fiber Mewlon AB (P100), tenacity of 10 cN/dtex, Young Modulus of 21.5 N/tex, melting temperature Tm of 240° C. with a specific surface-treatment for PP, supplied by Unitika, Japan.

"AP" is the ethylene polypropylene copolymer (functionalized with maleic anhydride) "TPPP6102 GA" of BYK Co. Ltd, Germany, having a MFR$_2$ (190° C.) of 20-40 g/10 min and a maleic anhydride content of >0.9 wt.-%.

"NIS" is the notched impact strength.
"UNIS" is the unnotched impact strength.
"HDT" is the heat deflection temperature A.

The compositions DIL1 to DIL4 were dry-blended for preparing inventive examples IE1, IE2 and IE3 as outlined in table 2. Comparative example CE1 was prepared by conventional compounding in a parallel, co-rotating twin screw extruder Brabender DSE20, coupled to an ECON EUP50 underwater pelletizer (UP). The DSE20 has a screw diameter (d) of 20 mm, and a length of 800 mm (40d). Injection molding of CE1, IE1, IE2 and IE3 was carried out on a Battenfeld HM 1300/350 injection molding machine. IE1, IE2 and IE3 were prepared by blending DIL1 and DIL3 or DIL2 or DIL4 in a weight ratio of about 3:1.

TABLE 2

| | | Examples | | | |
|---|---|---|---|---|---|
| Example | | CE1 | IE1 (DIL1 + DIL3) | IE2 (DIL1 + DIL2) | IE3 (DIL1 + DIL4) |
| hPP | [wt.%] | 75.8 | 65.8 | 69.0 | 71.8 |
| CF | [wt.%] | 22.2 | 22.8 | 22.8 | 22.8 |
| PF1 | [wt.%] | — | 9.4 | 6.2 | — |
| PF2 | [wt.-%] | — | — | — | 3.4 |
| AP | [wt.-%] | 2.0 | 2.0 | 2.0 | 2.0 |
| Density | [kg/m$^3$] | 980 | 1020 | 1010 | 990 |
| Tensile modulus | [MPa] | 3094 | 3619 | 3424 | 3753 |
| Tensile strength | [MPa] | 35.4 | 40.8 | 39.1 | 42.3 |
| Tensile Elongation at yield | [%] | 3.1 | 3.4 | 3.4 | 3.2 |
| Tensile Elongation at break | [%] | 3.6 | 3.8 | 3.9 | 3.3 |
| NIS (23° C.) | [kJ/m$^2$] | 2.2 | 21.9 | 15.9 | 4.5 |
| NIS (−20° C.) | [kJ/m$^2$] | 1.2 | 21.7 | 16.3 | 4.0 |
| UNIS (23° C.) | [kJ/m$^2$] | 11.3 | 25.1 | 20.4 | 14.3 |
| HDT A (0.45 Mpa) | [° C.] | 91.9 | 102.3 | 101.7 | 95.1 |

From table 2, it can be gathered that the inventive examples exhibit improved impact strength combined with high stiffness.

The invention claimed is:
1. A composite having an elongation at break in the range from 2.5 to 7.5%, the composite comprising:
   a) 25 to 92.5 wt. %, based on the total weight of the composite, of a polypropylene base material having a melt flow rate MFR$_2$ (230° C., 2.16 kg) measured according to ISO 1133 in the range of from 3.0 to 140.0 g/10 min, wherein the polypropylene base material is;
  i) a heterophasic propylene copolymer (HECO) comprising a (semicrystalline) polypropylene (PP) as a matrix in which an elastomeric propylene copolymer (EC) is dispersed; or
  ii) a propylene homopolymer (hPP); and
b) 5 to 50 wt. %, based on the total weight of the composite, of a cellulose-based fiber (CF); and
c) 2.5 to 25 wt. %, based on the total weight of the composite, of a polymer-based fiber (PF) having a melting temperature of ≥210° C.,
wherein the weight ratio of the cellulose-based fiber (CF) and the polymer-based fiber (PF) [(CF)/(PF)] is in the range of 2.0 to 20.0.

2. The composite according to claim 1, wherein the heterophasic propylene copolymer (HECO) has:
  a) a melt flow rate $MFR_2$ (230° C., 2.16 kg) in the range of from 5.0 to 120.0 g/10 min, and/or
  b) a xylene cold soluble (XCS) fraction (25° C.) of from 15.0 to 50.0 wt. %, based on the total weight of the heterophasic propylene copolymer (HECO), and/or
  c) a comonomer content of ≤30.0 mol. %, based on the heterophasic propylene copolymer (HECO).

3. The composite according to claim 1, wherein the amorphous fraction (AM) of the heterophasic propylene copolymer (HECO) has:
  a) a comonomer content in the range of 30.0 to 60.0 mol. %, based on the amorphous fraction (AM) of the heterophasic propylene copolymer (HECO), and/or
  b) an intrinsic viscosity (IV) in the range of 1.8 to 4.0 dl/g.

4. The composite according to claim 1, wherein the propylene homopolymer (hPP) has:
  a) a melt flow rate $MFR_2$ (230° C., 2.16 kg) in the range of from 5.0 to 120.0 g/10 min, and/or
  b) a melting temperature measured according to ISO 11357-3 of at least 150° C., and/or
  c) a xylene cold soluble (XCS) content, below 4.5 wt. %, based on the total weight of the propylene homopolymer (hPP).

5. The composite according to claim 1, wherein the cellulose-based fiber (CF):
  a) is selected from the group consisting of wood, flax, hem, jute, straw, rice, hardboard, cardboard, paper, pulp, raw cellulose, cellulose, cellulose acetate, cellulose triacetate, cellulose propionate, cellulose acetate propionate, cellulose acetate butyrate, nitrocellulose, methylcellulose, ethylcellulose, ethyl methyl cellulose, hydroxyethyl cellulose, hydroxypropyl cellulose (HPC), hydroxyethyl methyl cellulose, hydroxypropyl methyl cellulose (HPMC), ethyl hydoxyethyl cellulose, carboxymethyl cellulose (CMC), and any mixtures thereof, and/or
  b) has a volume moment mean (D[4.3]) diameter between 1 and 1 200 μm.

6. The composite according to claim 1, wherein the polymer-based fiber (PF) is selected from a poly vinyl alcohol (PVA) fiber, a polyethylene terephthalate (PET) fiber, a polyamide (PA) fiber and mixtures thereof.

7. The composite according to claim 1, wherein the polymer-based fiber (PF) has:
  i) a fiber average diameter in the range of 10 to 30 μm, and/or
  ii) a tenacity of from 3.0 cN/dtex to 17 cN/dtex.

8. The composite according to claim 1, wherein the polymer-based fiber (PF) has a melting temperature Tm according to ISO 11357-3 which is ≥42° C., above the melting temperature Tm according to ISO 11357-3 of the polypropylene base material.

9. The composite according to claim 1, wherein the weight ratio of the cellulose-based fiber (CF) and the polymer-based fiber (PF) [(CF)/(PF)] is in the range of 2.0 to 10.0.

10. The composite according to claim 1, wherein the composite comprises an adhesion promoter (AP) in an amount from 0.1 to 6.0 wt. %, based on the total weight of the composite.

11. A process for the preparation of a composite according to claim 1, comprising the steps of:
  a) providing a polypropylene base material,
  b) providing a cellulose-based fiber (CF),
  c) providing a polymer-based fiber (PF),
  d) melt-blending the cellulose-based fiber (CF) of step b) with the polypropylene base material of step a) such as to obtain a cellulose-based fiber reinforced polypropylene base material,
  e) impregnating the polymer-based fiber (PF) of step c) with the polypropylene base material of step a) such as to obtain a polymer-based fiber reinforced polypropylene base material,
  f) blending the cellulose-based fiber reinforced polypropylene base material obtained in step d) and the polymer-based fiber reinforced polypropylene base material obtained in step e), and
  g) injection molding the blend obtained in step f),
wherein step e) is carried out by pultrusion.

12. The process according to claim 11, wherein process step d) is carried out by extrusion and/or the polymer-based fiber (PF) of step c) is a continuous fiber.

13. The process according to claim 11, wherein process step e) comprises impregnating and coating the polymer-based fiber (PF) of step c) with the polypropylene base material (PBM) of step a), wherein impregnating and coating is carried out with the same or different polypropylene base material (PBM).

14. A molded article comprising a composite according to claim 1.

15. The molded article according to claim 14 being an automotive article.

* * * * *